United States Patent
Shin et al.

(10) Patent No.: US 10,964,469 B2
(45) Date of Patent: Mar. 30, 2021

(54) COOLING MAGNETIC CORES WITH FERROFLUID AND MAGNETIC CORES SO COOLED

(71) Applicant: Toyota Motor Engineering & Manufacturing North America, Inc., Plano, TX (US)

(72) Inventors: Jongwon Shin, Ann Arbor, MI (US); Shailesh Joshi, Ann Arbor, MI (US); Ercan Mehmet Dede, Ann Arbor, MI (US); Masanori Ishigaki, Nagakute (JP)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 402 days.

(21) Appl. No.: 15/966,349

(22) Filed: Apr. 30, 2018

(65) Prior Publication Data

US 2019/0333676 A1    Oct. 31, 2019

(51) Int. Cl.
*H01M 10/44* (2006.01)
*H01M 10/46* (2006.01)
(Continued)

(52) U.S. Cl.
CPC ............ *H01F 27/105* (2013.01); *B60L 53/12* (2019.02); *H01F 27/24* (2013.01); *H01F 38/14* (2013.01); *H02J 7/025* (2013.01)

(58) Field of Classification Search
CPC .......... H02J 7/025; H02J 50/10; H02J 7/0091; H02J 7/355; H02J 7/0042; H01F 27/08; H01F 27/105; H01F 27/24; H01F 1/44; H01F 1/445; B60L 2240/36
USPC .... 320/104, 107, 108, 150, 153; 336/94, 55, 336/58, 177, 179, 213; 310/11, 52, 54, 310/58, 64; 165/185, 120
See application file for complete search history.

(56) References Cited

U.S. PATENT DOCUMENTS 3,183,461 A    5/1965    Tipton
5,128,635 A    7/1992    Vaughan et al.
(Continued)

FOREIGN PATENT DOCUMENTS

EP    2575237 A2    3/2013
RU    2457565 C1    7/2011

OTHER PUBLICATIONS

Lazarus, N. et al., "Ferrofluid-based Stretchable Magnetic Core Inductors", J. Phys: Conf. Ser., 660 012007 pp. 1-6 (2015).
(Continued)

*Primary Examiner* — Edward Tso
(74) *Attorney, Agent, or Firm* — Christopher G. Darrow; Darrow Mustafa PC

(57) ABSTRACT

Core-coil devices operate by electromagnetic induction and include inductors, transformers, and electromagnets. Cooled core-coil devices include a magnetic core having a channel through it, and a coil wound around the core. Cooled core-coil devices additionally include a coolant loop that carries ferrofluid coolant through the channel and forms a loop with the channel that extends outside the core. Ferrofluid coolant circulates in the loop without a pump due to a thermo-magnetic response to the device's thermal and magnetic field gradients and thereby cools the core while simultaneously adding to the device's inductance.

20 Claims, 8 Drawing Sheets

(51) Int. Cl.
    *H01F 27/10*     (2006.01)
    *H02J 7/02*     (2016.01)
    *H01F 27/24*     (2006.01)
    *H01F 38/14*     (2006.01)
    *B60L 53/12*     (2019.01)

(56) References Cited

U.S. PATENT DOCUMENTS

| | | | |
|---|---|---|---|
| 5,462,685 | A | 10/1995 | Raj et al. |
| 7,916,480 | B2 | 3/2011 | Woody et al. |
| 7,952,875 | B2 | 5/2011 | Woody et al. |
| 2010/0071883 | A1* | 3/2010 | Vetrovec ............ F28D 15/00 165/121 |
| 2011/0180238 | A1* | 7/2011 | Vetrovec ............ F28D 15/00 165/104.28 |
| 2013/0076158 | A1* | 3/2013 | Motisse ............ H02K 44/085 310/11 |
| 2015/0076960 | A1 | 3/2015 | Detloff |

OTHER PUBLICATIONS

Kingsley-Hughes, A., "Apple's obsession with magnets could mean better cooling for your next Mac," Hardware 2.0 (2012).
Campbell, M., "Apple invention uses ferrofluids to enhance induction charging performance," AppleInsider (2016) http://appleinsider.com/articles/16/10/25/apple-invention-uses-ferrofluids-to-enhance-induction-charging-performance (accessed Apr. 27, 2018).

* cited by examiner

COOLING MAGNETIC CORES WITH FERROFLUID AND MAGNETIC CORES SO COOLED

TECHNICAL FIELD

The present disclosure generally relates to electromagnetic coil devices, such as inductors, and, more particularly, to cooling systems for such devices.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Core-coil electronic devices, such as transformers, inductors, etc. are widely used to control and modify the electronic power flows (i.e. circuits). Such devices can be subject to undesirable heating during operation. Liquid coolants can be used to remove excess heat from inside the cores of such devices, but implementation of coolant channels also undesirably diminishes the inductance of the device.

Accordingly, it would be desirable to provide improved designs and methods of cooling a core-coil device with minimal inductance loss.

SUMMARY

This section provides a general summary of the disclosure, and is not a comprehensive disclosure of its full scope or all of its features.

In various aspects, the present teachings provide a core-coil device. The core-coil device includes a core having at least one channel passing through it and an electromagnetic coil wound around at least a portion of the core. The core-coil device further includes at least one coolant loop passing through the at least one channel, such that the at least one channel forms a portion of the at least one coolant loop. The core-coil device further includes a ferrofluid at least partially filling the coolant loop.

In other aspects, the present teachings provide a wireless charging system for an electrified motor vehicle. The system includes a secondary battery configured to provide power to the vehicle powertrain, a rectifier in electrical communication with the battery and an electromagnetic induction receiver in electrical communication with the rectifier and configured to generate an alternating current in response to an oscillating magnetic field, the electromagnetic induction receiver includes a core having at least one channel passing through it and an electromagnetic coil wound around at least a portion of the core. The core-coil device further includes at least one coolant loop passing through the at least one channel, such that the at least one channel forms a portion of the at least one coolant loop. The core-coil device further includes a ferrofluid at least partially filling the coolant loop.

In still other aspects, the present teachings provide a method for cooling a core-coil electromagnetic device. The method includes a step of passing a coolant liquid comprising ferrofluid through a channel in a core of the device. The liquid coolant absorbs heat generated at the core. The method further includes a step of circulating the coolant liquid, via a response of the ferrofluid to magnetic flux generated by the device, through a coolant loop. The coolant loop carries the coolant liquid away from a channel exit and back to a channel entrance, thereby forming as loop.

Further areas of applicability and various methods of enhancing the disclosed technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present teachings provide cooled core-coil devices, such as inductors and transformers and methods for cooling them. The unique designs of the devices of the present teachings allow internal cooling via liquid coolant passed through the core, with no need for an external pump and little-to-no inductance loss.

The disclosed devices utilize coolant channels bored or otherwise running through the core. Conventional coolants for core-coil devices are not ferromagnetic, and thus the introduction of channels in the core would normally result in a loss of inductance due to diminished core mass. However, ferrofluid coolant is used in the devices of the present teachings, passing through the channel in the core where excess heat is absorbed. The ferrofluid coolant circulates through a coolant loop that carries it away from the core where the excess heat is released, before the ferrofluid coolant circulates back to the core. Because of the thermomagnetic effect of temperature sensitive magnetic fluids the ferrofluid coolant circulates along with magnetic flux in the coolant loop with no need for a pump, and it substantially replaces the inductance that would otherwise be lost due to the diminished mass resulting from the channel(s) in the core.

Figure 1A:
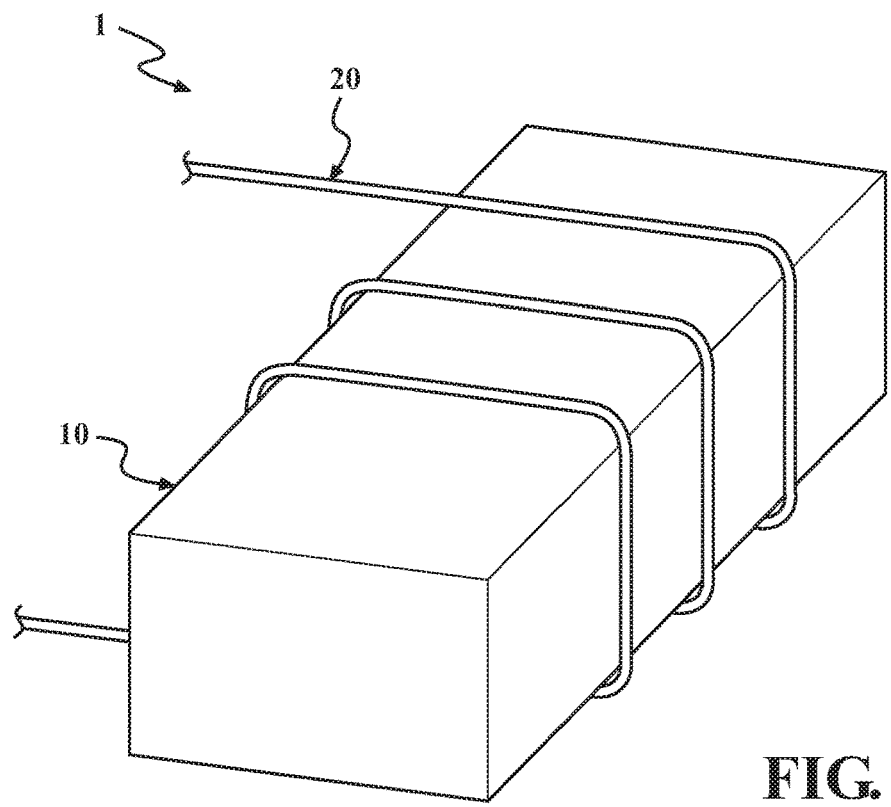
FIG. 1A is a perspective view of a conventional magnetic core having no cooling channel.

FIG. 1A shows a perspective view of a simplified, conventional core-coil device 1. The conventional device 1 has a core 10 and a conductive coil 20, such as a wire, wound around the core 110. The simplified device 1 of FIG. 1A can represent any core-coil device that operates on electromagnetic induction.

Figure 1B:
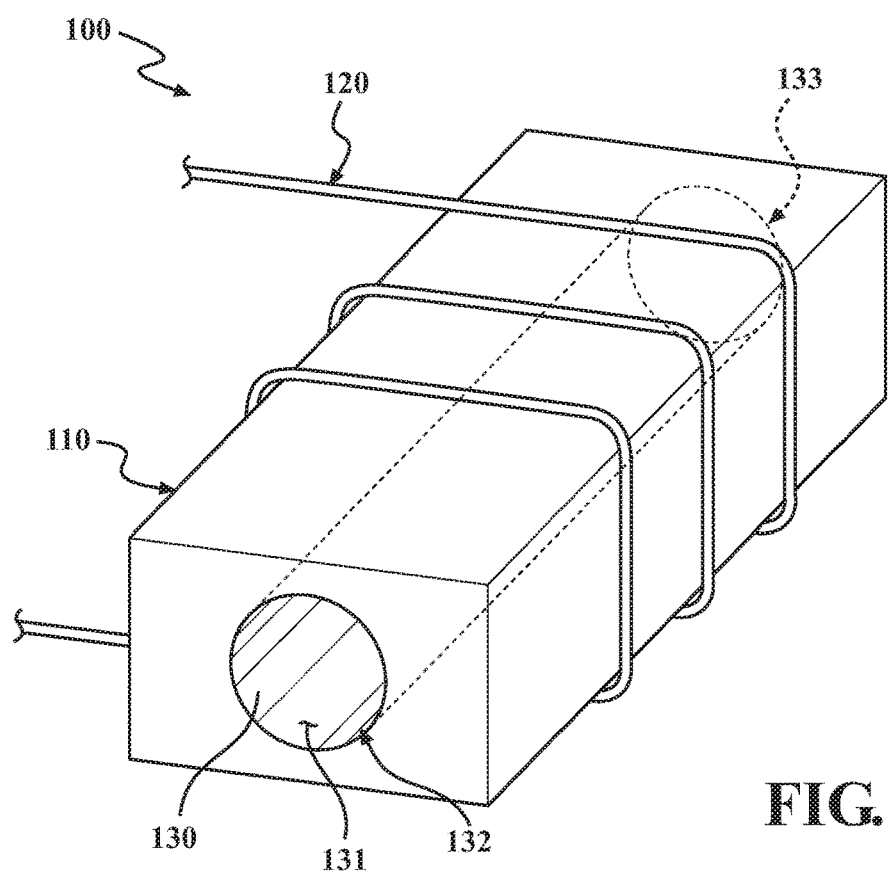
FIG. 1B is a perspective view of a magnetic core having an internal cooling channel, such as may be used with a coolant system as provided herein.

FIG. 1B shows a perspective view of a simplified cooled core-coil device 100 of the present disclosure. Similar to the conventional core-coil device 1 of FIG. 1A, the cooled core-coil device 100 of FIG. 1B includes a core 110 and a conductive coil 120. As discussed in greater detail below, the core 110 can be a solid magnetic core, but need not necessarily be so. The cooled core-coil device 100 of FIG. 1B additionally has a coolant channel 130 that passes through the core 110, having an entrance and an exit, which may be interchangeable.

The coolant channel 130 is defined and bounded by one or more channel perimeter walls 131, bored or otherwise formed or defined internally in the core 110. In some implementations, the one or more channel perimeter walls can be lined with a material. In implementations in which the core 110 is not solid (e.g. an air core), the one or more perimeter walls 131 will necessarily be a line, i.e. a tube or pipe will pass through the core 110, thereby defining the coolant channel 130. In many implementations, the coolant channel 130 will be substantially linear, having a longitudinal axis. In some implementations, the coolant channel 130 can be arcuate, curvilinear, include one or more bends or rounded turns, etc. In such implementations, it will generally be desirable that the portion of the coolant channel 130 passing through the conductive coil 120 be substantially linear, and the coolant channel 130 may have a major axis defined by the average direction of fluid flow in the coolant channel 130. In general, the longitudinal axis, the major axis, and/or the portion of the coolant channel 130 passing through the conductive coil 120 will be substantially perpendicular to the direction in which the conductive coil 120 is wound around the core 110. Stated more simply, the coolant channel 130 is generally perpendicular to the conductive coil 120 winding.

Putting internal cooling channel(s) 130 in the core 110 is an efficient way to cool down the core 110. However, there is a tradeoff between the cooling performance and inductance of the magnetic core: since the core volume is sacrificed by the coolant channel, its inductance is smaller than an otherwise identical device lacking the cooling channel. Specifically, while the coolant channel 130 can carry coolant that is air or a conventional coolant liquid, the core 110 of the cooled core-coil device 100 of FIG. 1B has a smaller mass and volume compared to the core 10 of the conventional core-coil device 1 of FIG. 1A. Therefore, the cooled core-coil device 100 of FIG. 1B has comparatively diminished inductance, assuming the two devices 1, 100 have the same configuration of the coil 20, 120 and the same outer dimensions of the core 10, 110. Therefore, if air or a conventional coolant liquid is used, the outer dimensions of the core 110 would have to be increased in order to maintain the same total core 110 mass/volume and thereby maintain the same inductance. For this reason, the internal coolant channel 130 of a cooled core-coil device 100 of the present teachings carries a ferrofluid-based coolant during operation.

As used herein, the term ferrofluid carries its usual meaning, but also refers to a liquid that becomes magnetized and experiences convection due to a thermo-magnetic body force in the presence of both a thermal and magnetic field. Typically, a ferrofluid will be a colloidal suspension of ferromagnetic and/or ferrimagnetic nanoparticles in an aqueous, organic, or mixed carrier liquid. Suitable magnetic nanoparticles for use in a ferrofluid can include, without limitation, iron, a ferrous alloy, an oxide of iron such as magnetite or hematite, or any other ferrous or non-ferrous ferromagnetic (including ferrimagnetic) material. Another example coolant may be a Mn—Zn particle-based magnetic fluid, where the Curie temperature of the fluid is close to the typical operational temperature of an electronics device (e.g. approximately 100° C.). As with many nanoparticulate colloidal suspension, particles in the ferrofluid will typically be surfactant coated to minimize agglomeration. In some implementations, a ferrofluid can include larger particles, such as the micrometer-scale ferromagnetic and/or ferromagnetic particles of a conventional magnetorheological fluid, but this would generally not be preferred.

Cooled core-coil devices 100 of the present teachings can include any type of electrical, electromechanical, or magnetic device having a core 110 and a coil 120 wound around at least a portion of the core 110. Such devices include, without limitation: electromagnets; transformers; generators; inductors; and electric motors; and various types of static or dynamic wireless power transfer systems for electrified vehicles. It will be understood that in mechanical-electromagnetic devices (e.g. generators and motors) the stator may include the core of the cooled core-coil device 100 in order to implement the cooling system.

The core 110 can be any type of core useful in core-coil devices. In many implementations, the magnetic core 110 can be formed substantially of a ferromagnetic or ferrimagnetic material. Exemplary materials suitable for use in the magnetic core include, without limitation: iron and various steels, such as silicon steel; magnetite ($Fe_3O_4$); and various ferrites, typically soft ferrites, such as manganese-zinc ferrite [abbreviated MnZn and having a formula $Mn_aZn_{(1-a)}Fe_2O_4$] or nickel-zinc ferrite (abbreviated NiZn and having a formula $Ni_aZn_{(1-a)}Fe_2O_4$]. In different implementations, the magnetic core 110 can be formed substantially of a solid metal (e.g. soft iron); a powdered metal (e.g. iron, molypermalloy, NiFe, or Sendust); ceramics (e.g. various ferrites); or a combination thereof. In some implementations, a cooled core-coil device 100 of the present teachings can have a magnetic core 110 composed substantially of air, i.e. an "air core". In such implementations, discussed in greater detail below, one or more channels of ferrofluid coolant pass through the air core and can carry high-density magnetic flux to form an inductor or transformer. A core that is formed substantially of a solid ferromagnetic or ferromagnetic material can be referred to hereinafter as a "solid magnetic core."

In general, the conductive coil 120 is what is commonly referred to as a "winding" in the art. The composition and configuration of the conductive coil 120 can be any known in the art and/or suitable for the electromagnetic function of the device 100. In many implementations, the conductive coil 120 can be a wire wound around at least a portion of the core 110, and which can optionally be insulated. The conductive coil 120 can include more than a single conductor and or can include more than one coil configuration. For example, the conductive coil 120 could include two conductors, coiled in opposite directions (i.e. left-handed vs. right-handed), and connected in series.

Figure 2A:
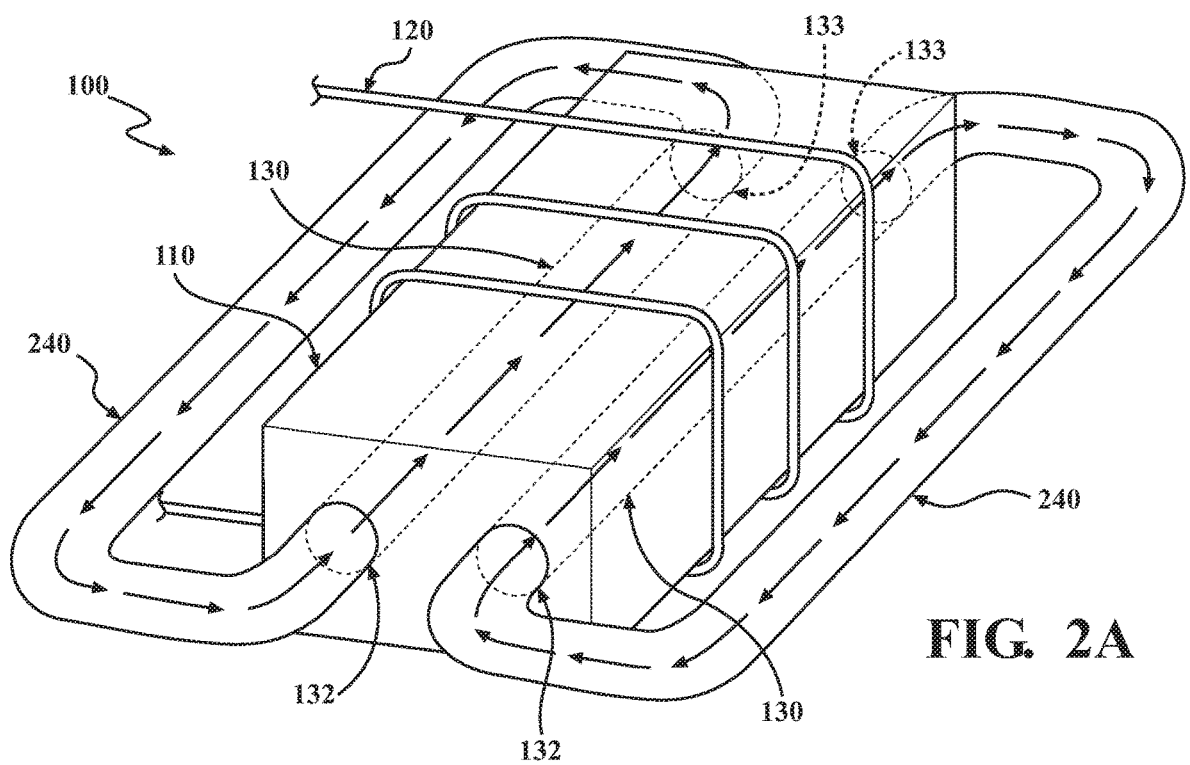
FIG. 2A is a perspective view of an exemplary ferrofluid cooled magnetic core of the present teachings, having a bar-shaped magnetic core with two channels for ferrofluid.
Figure 2B:
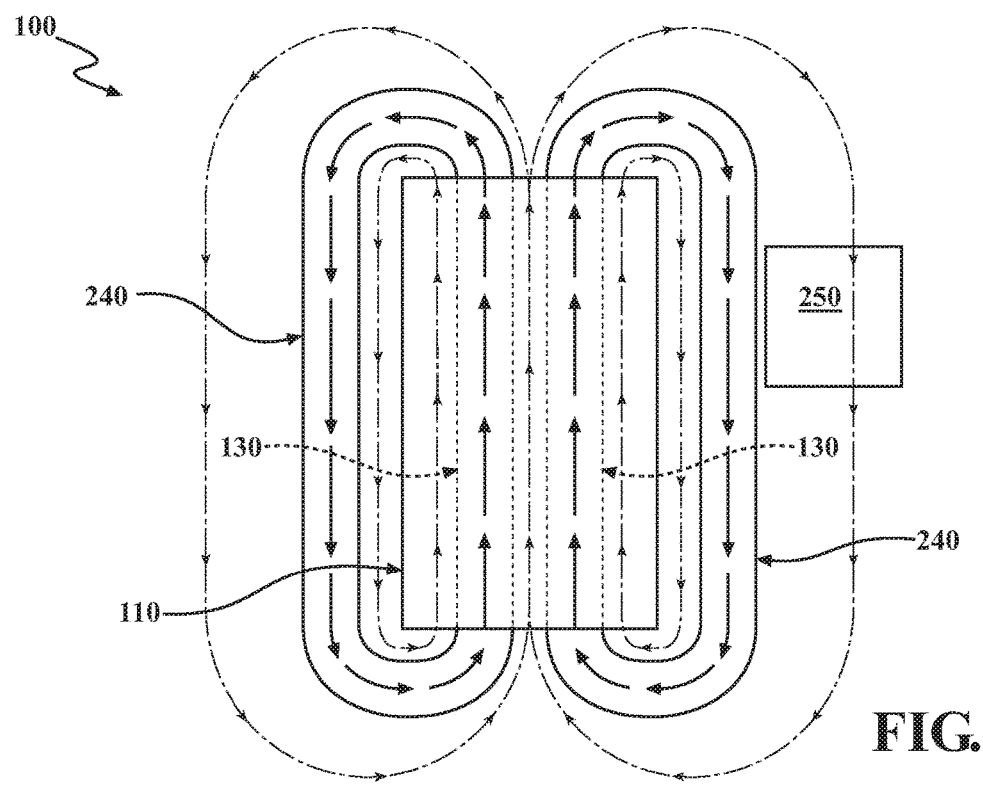
FIG. 2B is a top plan view of the ferrofluid cooled magnetic core of FIG. 2A.

While the example of FIG. 1B shows a single coolant channel 130 transiting the core 110, any number of coolant channels 130 can be used. FIGS. 2A and 2B show schematic perspective and top plan views, respectively of a cooled core-coil device 100 having two coolant channels 130. Though FIGS. 2A and 2B show the case of a bar with two channels, the shape, dimension, and number of channels 130 are not limited. In many implementations, and regardless of the shape, dimension, and number of coolant channels 130 present in the magnetic core 110, the coolant channel(s) 130 will be distributed in a symmetrical manner about one or more axes or plains of symmetry in the magnetic core 110, as discussed in greater detail below.

With continued reference to FIGS. 2A and 2B, a cooled core-coil device 100 of the present teachings further includes a coolant loop 240, forming a liquid circuit by placing the entrance 132 of a coolant channel 130 in fluid communication with the exit 133 of a coolant channel. In many implementations, the coolant loop 240 will place the entrance 132 of a coolant channel 130 in fluid communication with the exit 133 of a coolant channel, as in the example of FIGS. 2A and 2B. In some aspects, the coolant loop 240 can be considered to include the coolant channel 130, and to have two portions: the interior portion, which is the coolant channel 130; and the exterior portion, which is all of the coolant loop 240 except for the coolant channel 130.

The coolant loop 240, and/or the exterior portion of the coolant loop 240 can be any suitable pipe or tubular capable of forming a closed fluid circuit consistent with the dimensions of the device 100. The coolant channel 130 can be lined with the material or materials of which the exterior portion of the coolant loop 240 is composed. In many such implementations, the entire coolant loop 240, including interior and exterior portions, can include a continuous tube or pipe. In many implementations, the coolant loop will be partially or completely filled with a ferrofluid, which will circulate in the coolant loop 240 during operation of the device 100.

In the following discussion, the phrase "magnetic flux" refers, not to a scalar quantity, but to continuous regions, forming loops around the device 100, having equivalent magnetic flux and/or magnetic field intensity. With particular reference to FIG. 2B, it will be understood that when alternating current is passed through the conductive coil 120, it generates a magnetic field through and around the device, referred to loosely herein as "magnetic flux" represented two-dimensionally by magnetic field lines, or loops formed of arrows in FIG. 2B. Additionally, a thermal field is generated due to heat dissipation of the magnetic device. It will be understood that ferrofluid present in the coolant loop 240 will circulate and cycle through the coolant loop 240 in response to the thermal field gradients plus the magnetic flux, due to the thermo-magnetic characteristics of the ferrofluid. Here, the fluid is attracted to regions of high magnetic field strength, and additionally as the fluid temperature approaches the Curie temperature of the fluid, the coolant experiences a different body force due to a change in fluid magnetization that induces fluid motion. It will be appreciated that some of the magnetic flux (indicated by solid-line arrows) travels along with the ferrofluid in the coolant loop 240. Other magnetic flux (indicated by irregularly dashed arrows) travels through the core 110 and the free space or air surrounding the device 100. The total inductance of the device 100 is determined by the sum of the two categories of flux. It will further be understood that because magnetic flux inherently forms a loop (in two-dimensions) through and around the device 100, the coolant loop 240 should generally form a loop of comparable configuration, to facilitate efficient circulation of ferrofluid through the coolant loop 240. It will also be understood, however, that the configuration or shape of the coolant loop 240 can be used to affect or alter the shape of the thermal and magnetic fields of the device 100, i.e. by altering the shape of thermal contours and magnetic field lines/the travel path of magnetic flux.

It will further be understood that operation of the device 100 generates heat, particularly in the core 110, and especially in the portion of the core 110 around which the conductive coil is wound. Therefore, as ferrofluid circulates through the coolant loop 240 in response to the magnetic flux, the ferrofluid absorbs heat from the core 110 and carries the absorbed heat to the exterior portion of the coolant loop 240 where it can release the absorbed heat to the surrounding environment. It will be understood that magnetization of ferrofluid is generally temperature-dependent, such that cooler ferrofluid has relatively greater magnetization than warmer ferrofluid below the fluid Curie temperature. Thus, the greatest circulation impetus may be imparted in the cooler portion of the coolant loop 240. It will be further understood that, even in situations in which the temperature of ferrofluid coolant passing through the core 110 exceed the Curie temperature, the circulation impetus of cooler ferrofluid passing through the exterior portion of the coolant loop 240 may cause all of the ferrofluid, including that passing through the coolant channel 130, to circulate if the resultant fluid body force is sufficiently large.

In many implementations, at least a part of the portion of exterior portion of the coolant loop 240 can pass adjacent to, and/or contact a heat sink 250. In some implementations, the exterior portion of the coolant loop 240 can travel entirely, or virtually entirely, surrounded by a heat sink 250. A heat sink 250 can be any device or structure suitable to absorb or direct heat away from the exterior portion of the coolant loop, such as a second coolant loop passing adjacent to the exterior portion of the coolant loop, a fan, a Peltier cooler, a fluid bath, or a solid structure having high heat conductivity.

Ferrofluid cooled core-coil devices 100 of the present teachings have multiple benefits relative to devices having conventional cooling designs. First, the ferrofluid cooled core-coil devices 100 can be operated at higher power density (power per conversion system volume [kW/L or kW/in$^3$]) in the case of power conversion devices, without suffering substantial heat-induced efficiency losses. Related to this, the mass and volume of the core can be decreased relative to an uncooled device (e.g. 1, FIG. 1A) or a device cooled with non-ferromagnetic coolants, since the loss of inductance is minimized or eliminated by the ferrofluid. As alluded to above, devices 100 of the present teachings can comparatively have equal inductance and/or power density at a smaller size; or greater inductance and/or power density at the same size. In addition, the cooled core-coil devices 100 of the present teachings do not require an external pump to circulate coolant since, as described above, ferrofluid coolant naturally circulates in the coolant loop 240 in response to the generated thermal and magnetic field gradient. This beneficial feature further makes the cooled core-coil device 100 simple and compact.

Figure 3:
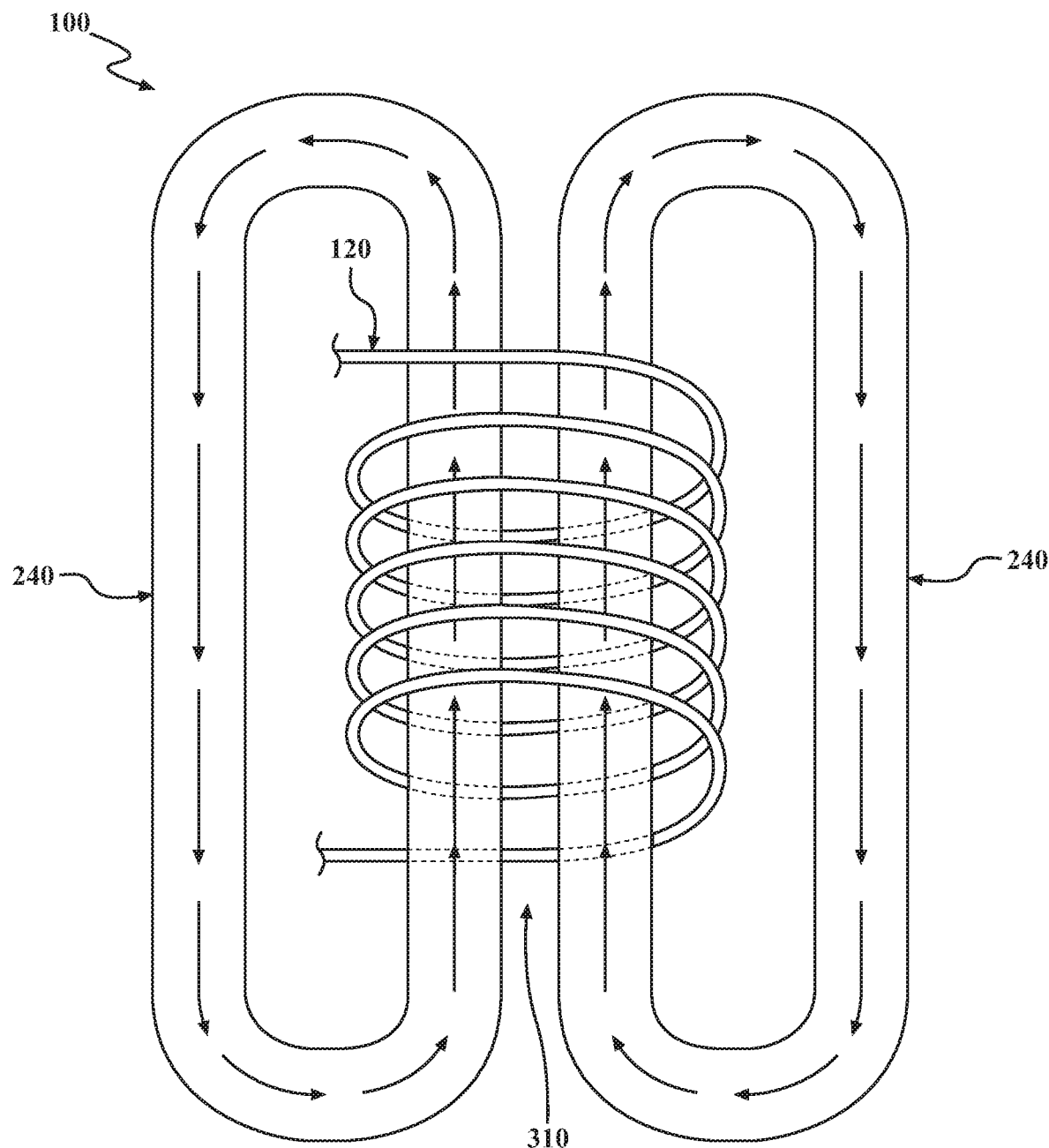
FIG. 3 is a top plan view of an inductor having no stationary magnetic core, with two ferrofluid channels and a coil.

As mentioned above, in some instances, a core-coil device 100 of the present teachings can have a core 110 that is an air core, and/or they can otherwise lack a solid magnetic core. FIG. 3 shows a cooled core-coil device that is substantially identical to the device 100 of FIGS. 2A and 2B, but that does not have a solid magnetic core. The device 100 of FIG. 3 has an electromagnetic coil wound around an air core 310, and has two coolant channels 130 carrying ferrofluid through the air core. In such an implementation, the ferrofluid within the coolant channel(s) 130 becomes the only magnetic, induction-enhancing portion of the core. As alluded to above, cooled core-coil devices 100 can lack a solid magnetic core without necessarily having an air core. This means the core 110 can optionally be composed of a solid non-magnetic material, such as a non-ferromagnetic ceramic.

Figure 4A:
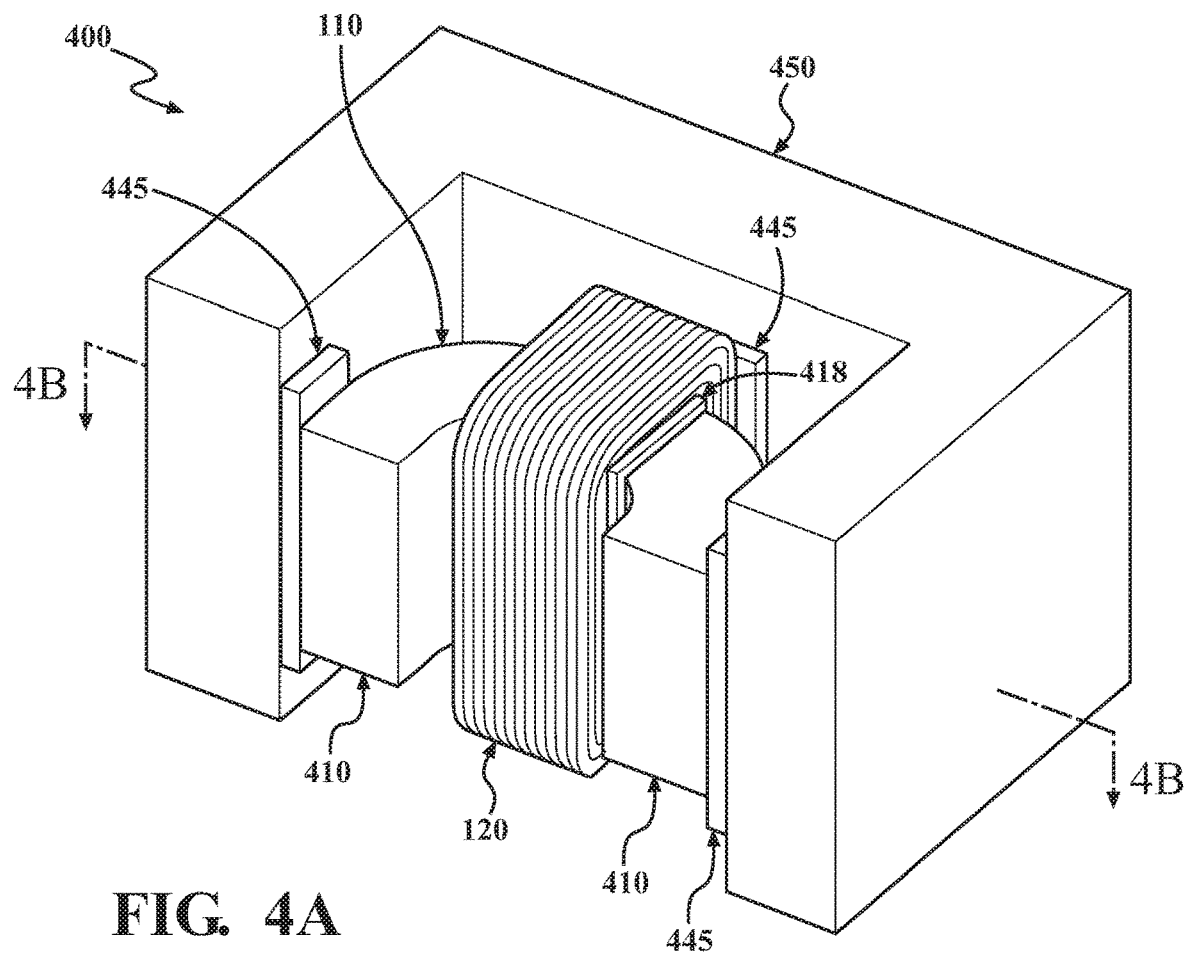
FIG. 4A is a perspective view of an exemplary inductor having a self-contained channel for ferrofluid coolant.
Figure 4B:
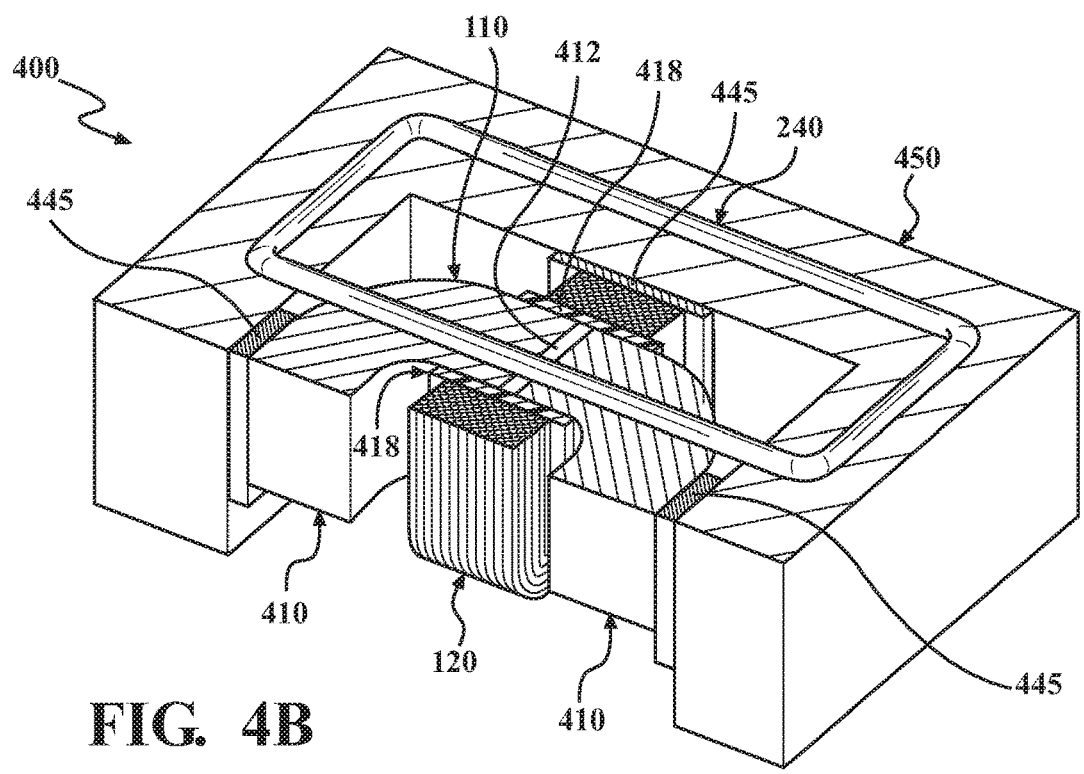
FIG. 4B is a perspective cross-sectional view of the inductor of FIG. 4A, the cross-section taken along the line 4B-4B, and showing the self-contained channel for ferrofluid coolant.

FIGS. 4A and 4B show a more detailed depiction of an inductor 400 having a two-piece "U" shaped magnetic core 110, composed of two pieces 410. FIG. 4A shows a perspective view of the inductor 400, while FIG. 4B shows a perspective view of a cross-section taken along the line 4B-4B. With reference to the inductor of FIGS. 4A and 4B, it is to be understood that cores 110 of the disclosed cooled core-coil devices 110 can be formed of one piece or of more than one piece. It is further to be understood that cores 110 of the disclosed cooled core-coil devices 110 can be of any suitable shape, including, without limitation: block or "I" core (as in FIGS. 1B, 2A, and 2C); "C" or "U" core (as in FIGS. 4A and 4B); "E" core; planar core; pot core; toroidal core; or a combination of these, such as "E" and "I" core.

The conductive coil 120 is wound around the core 110 of the inductor 400 and may be separated from the core 110 by a plastic bobbin 418, around which the electromagnetic core is directly wound. The core 110 is positioned adjacent to and partially within a heat sink 350, and is separated from the heat sink 250 by three thermal pads 445. The coolant channel 130 passes through both pieces 410 of the core 110 and forms part of the coolant loop 240 that transits the heat sink 250. Thus, as ferrofluid coolant cycles through the heat loop, it absorbs heat generated in the core and deposits it in the heat sink 250.

Figure 4C:
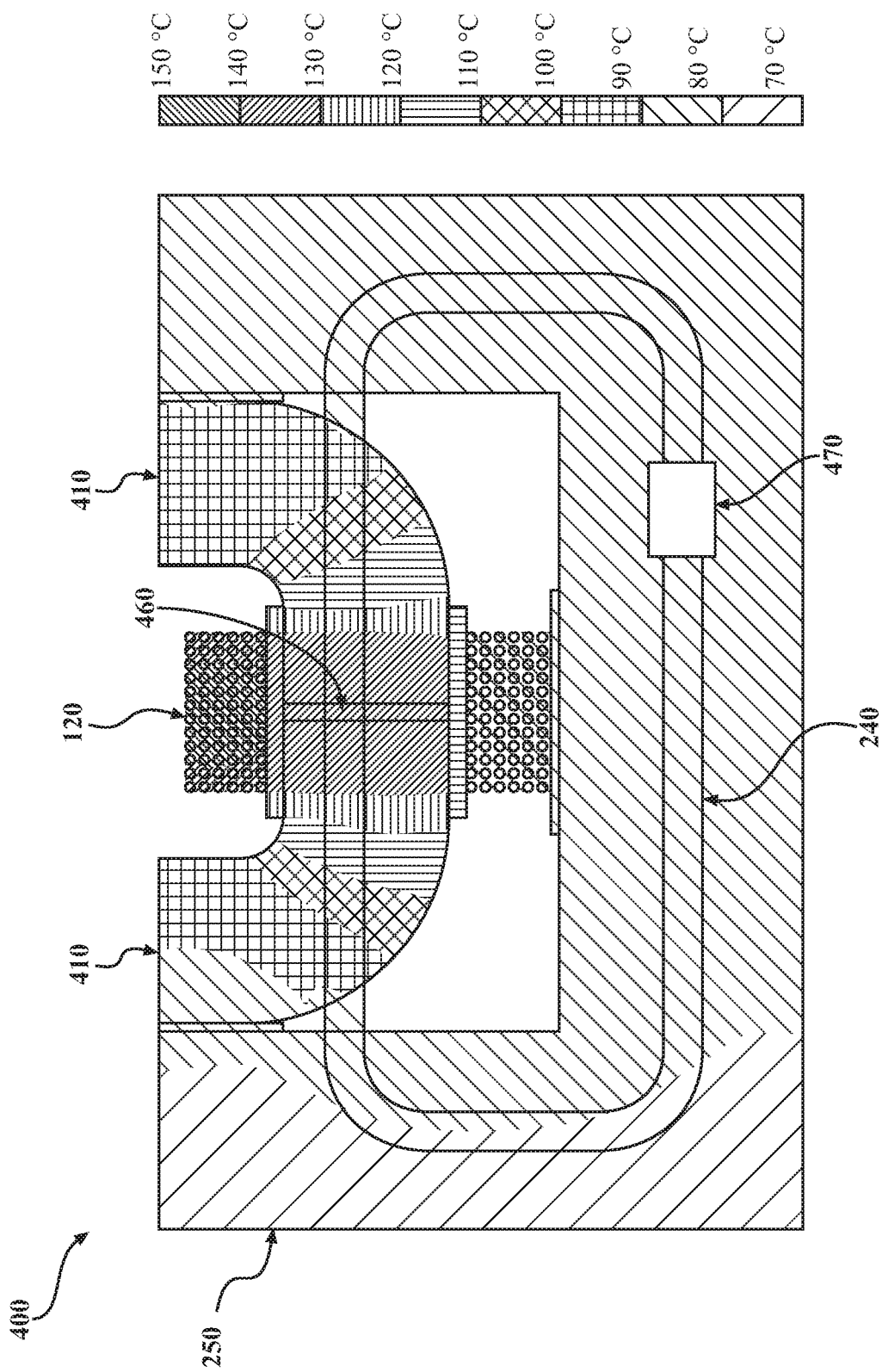
FIG. 4C is a magnified top cross-sectional view of the inductor of FIG. 4A and taken along the same line as the perspective cross-sectional view of FIG. 4B, and showing temperature distribution of the inductor during operation.
Figure 4D:
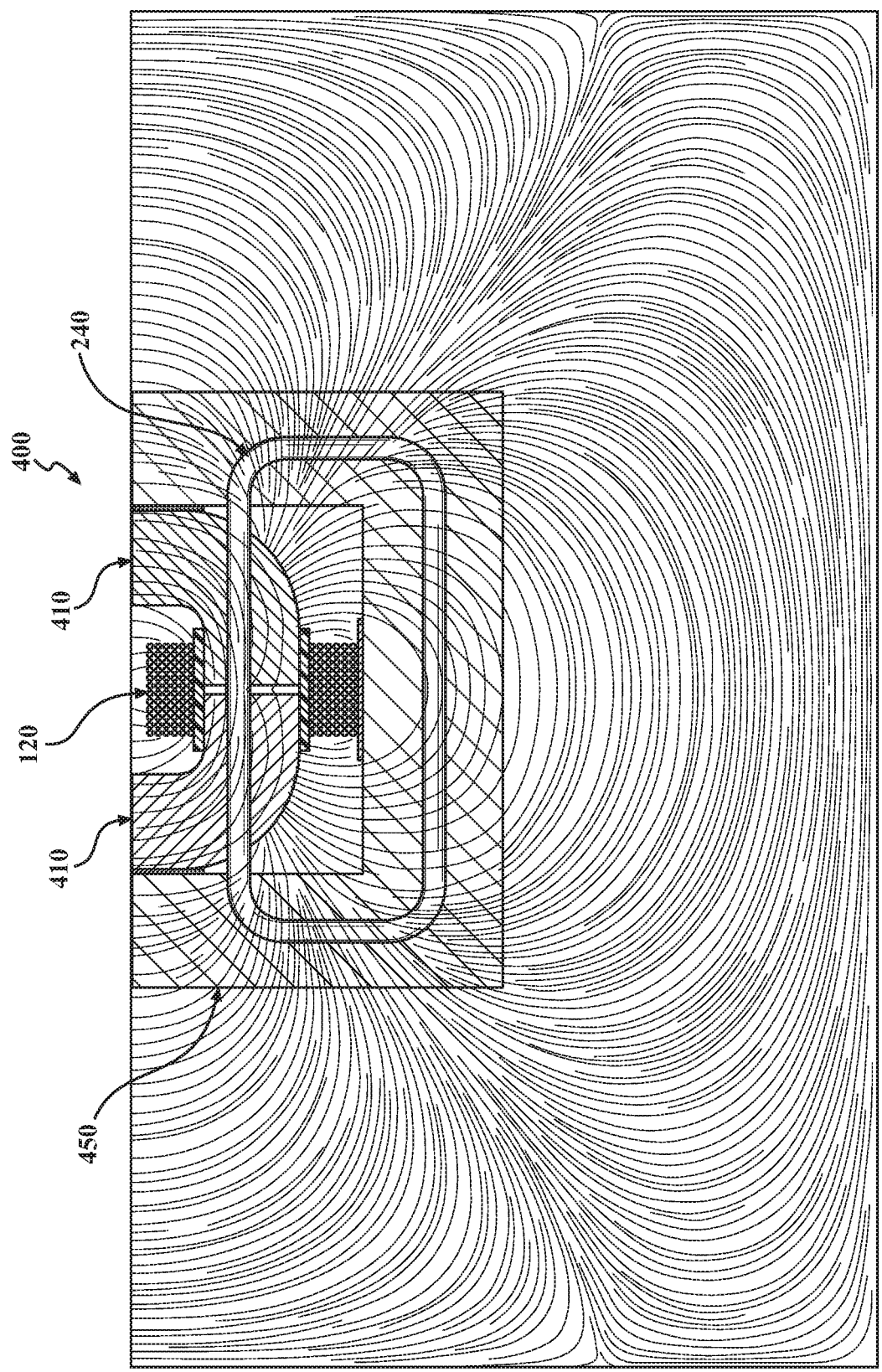
FIG. 4D is a top cross-sectional view of the inductor of FIG. 4A and taken along the same line as the perspective cross-sectional view of FIG. 4B, and showing magnetic field distribution during operation.

FIGS. 4C and 4D are top cross-sectional views of the inductor of FIG. 4A and taken along the same line as the perspective cross-sectional view of FIG. 4B. FIG. 4C shows a calculated temperature distribution across the inductor 400 during operation, with the heat sink 250 maintained at 65° C. As would be expected, the highest temperature is present in the core 110 where it is surrounded by the conductive coil 120, and gradually diminishes moving outward across the core 110. The highest temperature region of the coolant loop 250 can be referred to as a hot spot 460, being exposed in the illustrated example to a temperature of about 150° C. Thus, as ferrofluid coolant cycles through the coolant loop 240, it absorbs heat in the hot spot 460, generated in the portion of the core 110 that is surrounded by the conductive coil 120. The ferrofluid coolant then carries this excess heat into the portion of the coolant loop 240 that transits the heat sink 250 and transfers the excess heat to the heat sink 250.

FIG. 4D shows calculated magnetic field lines distributed around the inductor 400 during operation. It will be understood that ferrofluid will circulate through the coolant loop 240 without requiring an external pump, due to the thermomagnetic nature of the ferrofluid and the spatial variation in temperature and magnetic fields. This effect can be enhanced by the changing temperature around the coolant loop and the typical temperature dependence of a ferrofluid's ferromagnetism. This provides another feature whereby cooled core-coil devices of the present teachings can be made more compact than conventional core-coil devices having conventional coolant systems.

It should be understood that any system that contains core-coil devices, such as those mentioned above, can adopt this technique. In particular, systems and devices with kilowatt-level rated power, such as street-level transformers, are a good candidate to apply this technique. It should also be understood that any attributes or features described in connection with a specific implementation, such as the inductor of FIGS. 4A-4D, can be applied to other core-coil devices.

It will be understood, however, that the intrinsic flow of the ferrofluid coolant, that results from its response to spatial variation in ambient magnetic field and to temperature variations, may not provide sufficient cooling in some high power and high temperature applications. In such implementations, and with continued reference to FIG. 4C, a cooled core-coil device 100 can include a sensor 470 configured to measure flow rate of the ferrofluid coolant at one or more positions in the coolant loop 240. The sensor 470 can be in a signal communication with a controller configured to activate a secondary cooling device. The secondary cooling device can be any apparatus that, when activated, will additionally cool the cooled core-coil device. As mentioned above, the rate of flow of the ferrofluid coolant is expected to change in response to both the temperature and magnetic fields, since the ferromagnetism of the ferrofluid changes with temperature. In such implementations, the controller can be configured to activate the secondary cooling device when the sensor 470 measures a flow rate beyond a pre-determined threshold rate. Therefore, in such implementations, the system can use ferrofluid flow rate as a proxy to determine elevated temperature requiring activation of the secondary cooling device.

Figure 4E:
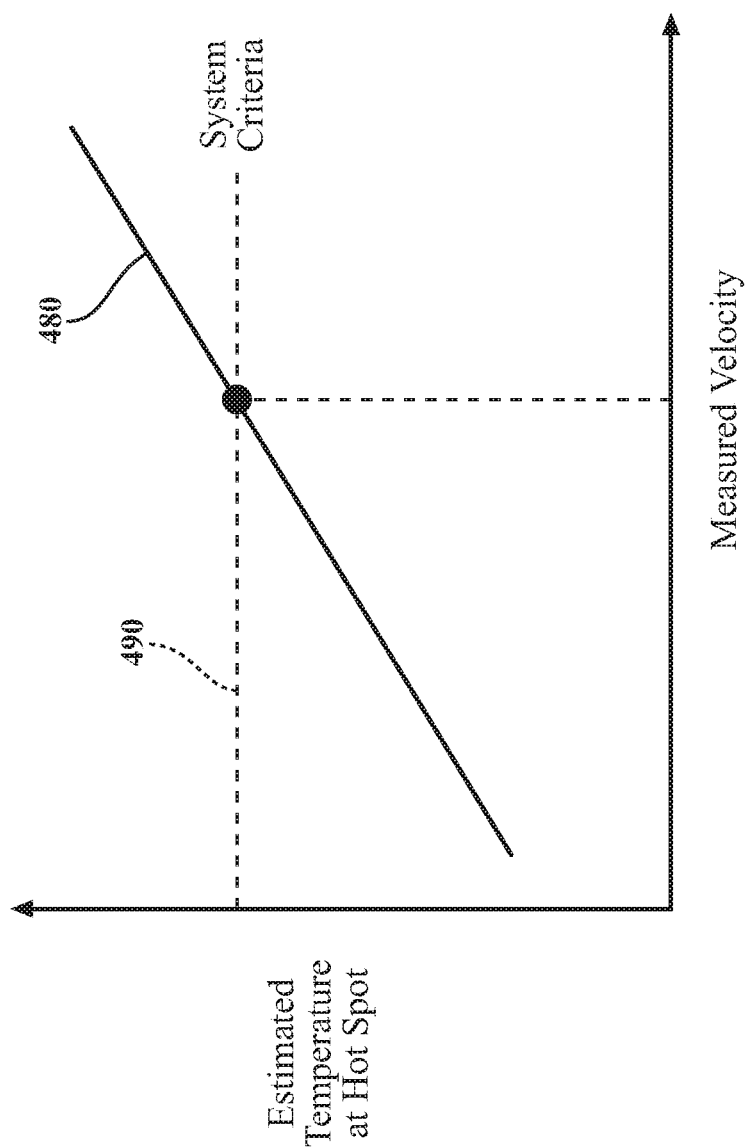
FIG. 4E is a graph showing a relationship between temperature and flow speed of ferrofluid coolant in a ferrofluid cooled magnetic core device of the present teachings.

It will be understood that such a set-up can obviate the need for a temperature sensor, such as otherwise might be needed to detect temperature, and assist in preventing excessive temperature, at the hot spot 460. For example, in some embodiments, the controller can further include, or have access to, a data set correlating flow rate at the sensor 470 to temperature at the hot spot 460. FIG. 4E is a graph showing an exemplary correlation between temperature at the hot spot 460 and flow speed of the ferrofluid coolant. Line 480 shows flow rate measured by sensor 470, and line 490 represents a system criteria, or maximum desired temperature, at the hot spot, such as may be defined to the controller. Thus, by measuring the flow rate of ferrofluid coolant at the temperature sensor 470, the system can estimate temperature at the hot spot 460. The system can thereby determine when the temperature at the hot spot 460 approaches or exceeds the system criteria, and the controller can activate the secondary cooling device. It will further be understood that this arrangement can operate in the absence of a temperature sensor, such as might otherwise be required at or near the hot spot 460. Because such an embedded temperature sensor could distort thermal resistance and/or flow resistance around the hot spot 460, this arrangement improves economy and performance of the device 400.

In another implementation, cooled core-coil devices 100 of the present teachings can be employed in static or dynamic wireless power transfer systems for electrified vehicles. It will be understood that such power transfer systems transfer high, kW-level power, and thus inductor cores present in such systems tend to produce considerable heat. As such, performance of such systems can be improved by utilizing a compact cooling system that maintains maximum inductance of the core. As discussed above, the ferrofluid itself not only cools the inductor, but also contributes to containing and steering the magnetic flux. Utilizing the ferrofluid as the coolant for the electromagnetic devices in such systems enables both the heat and the magnetic flux to flow through the ferrofluid.

Figure 5:
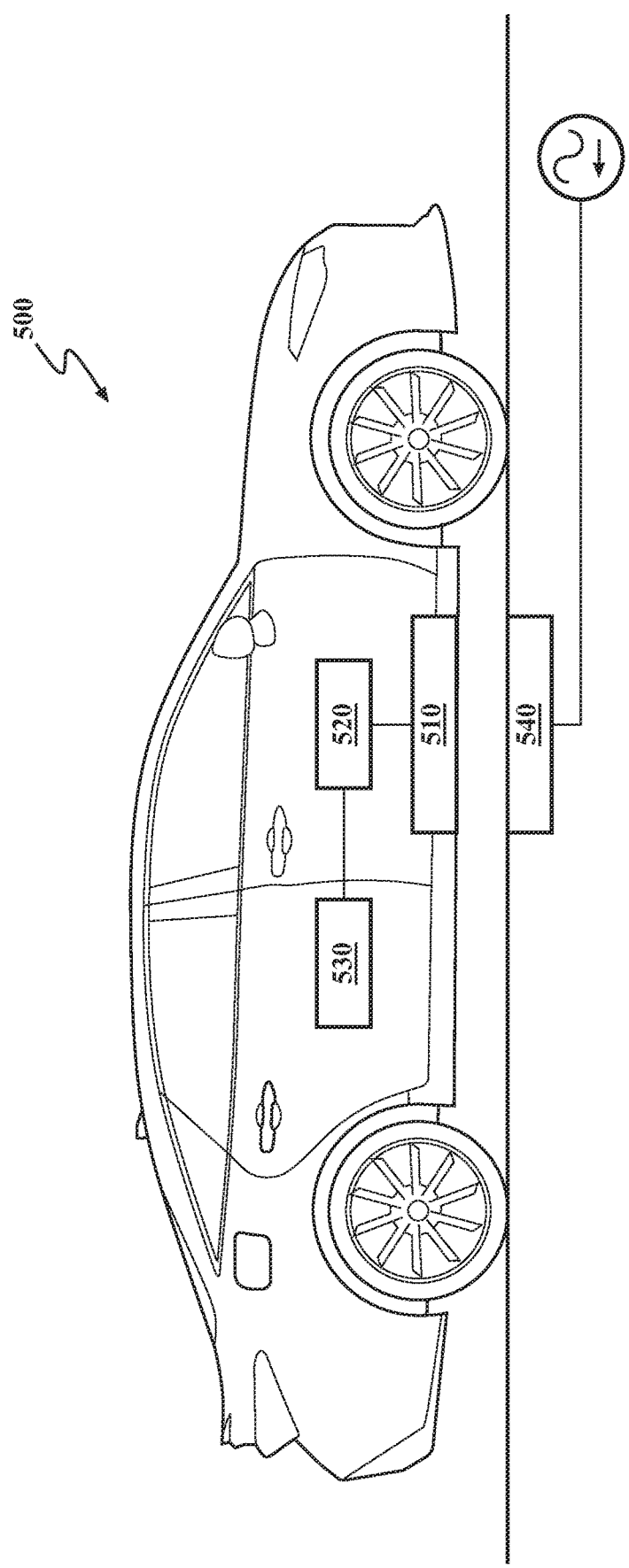
FIG. 5 is a schematic view of a wireless charging system for an electrified vehicle, the system having a core-coil device of the present teachings.

FIG. 5 shows a schematic view of a disclosed wireless charging system 500 for an electrified vehicle. The wireless charging system 500 can include an electromagnetic induction receiver 510 located onboard an electrified vehicle. The electromagnetic induction receiver 510 can include a cooled core-coil device 100 such as an inductor, as described above, and is configured to generate an alternating current in response to an oscillating magnetic field. The electromagnetic induction receiver 510 can be in electrical communication with one or more power management devices 520 located onboard the vehicle, typically including a rectifier and various other electronics to make the power produced at the induction receiver 510 suitable for battery charging. The system can further include a secondary battery 530 in electrical communication with the one or more power management devices 520 and configured to provide power to the vehicle drivetrain. The system 500 can include one or more electromagnetic induction transmitters 540 located offboard the vehicle, such as at a wireless charging station or periodically on a roadway. The one or more electromagnetic induction transmitters 540 can be in electrical communication with an AC power source, and are configured to provide an oscillating magnetic field to the electromagnetic induction receiver 510 when a transmitter 540 and receiver 510 are positioned properly relative to one another.

A method for cooling a core-coil electromagnetic device 100 is disclosed. The method includes a step of inducing magnetic and temperature fields around a core 110 of the core-coil device 100, thereby inducing flow of a coolant liquid comprising ferrofluid through the core 110 and transferring heat generated by the core-coil electromagnetic device 100 to the coolant fluid. The liquid coolant absorbs heat generated at the core 110. The method further includes a step of circulating the coolant liquid, via a response of the ferrofluid to temperature and magnetic field gradients generated by the device 100, through a coolant loop 240, removing heat from the coolant fluid. The method further includes a step of directing the coolant fluid back to the core of the core-coil electromagnetic device, thereby forming a continuous moving coolant loop. The coolant loop 240 carries the coolant liquid away from a channel exit 133 and back to a channel entrance 132, thereby forming a loop 240. The structural features described in relation to the method are as described above.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A core-coil device comprising:
    a core having at least one channel passing through it;
    an electromagnetic coil wound around at least a portion of the core;
    at least one coolant loop passing through the at least one channel, such that the at least one channel forms a portion of the at least one coolant loop; and
    a ferrofluid at least partially filling the coolant loop,
    wherein the coolant loop is substantially aligned with magnetic flux generated by the core-coil device.

2. The core-coil device as recited in claim 1, wherein the core comprises a solid magnetic core.

3. The core-coil device as recited in claim 2, wherein the solid magnetic core comprises a material selected from the group consisting of: iron; and an iron-containing alloy.

4. The core-coil device as recited in claim 2, wherein the solid magnetic core comprises a "U" core.

5. The core-coil device as recited in claim 1, further comprising a heat sink positioned to receive heat directly from ferrofluid in the coolant loop.

6. The core-coil device as recited in claim 4, wherein a portion of the at least one coolant loop exclusive of the coolant channel passes through the heat sink.

7. The core-coil device as recited in claim 1, further comprising:
- a sensor configured to determine a flow rate of ferrofluid coolant at one or more positions in the coolant loop; and
- a controller in signal communication with the sensor, and configured to activate a secondary cooling device when the sensor measures a flow rate beyond a threshold.

8. A wireless charging system for an electrified motor vehicle, the system comprising:
- a secondary battery configured to provide power to the vehicle powertrain;
- a rectifier in electrical communication with the battery; and
- an electromagnetic induction receiver in electrical communication with the rectifier and configured to generate an alternating current in response to an oscillating magnetic field, the electromagnetic induction receiver comprising:
  - a core having at least one channel passing through it;
  - an electromagnetic coil wound around at least a portion of the core;
  - at least one coolant loop passing through the at least one channel in the, such that the at least one channel forms a portion of the at least one coolant loop; and
  - a ferrofluid at least partially filling the coolant loop.

9. The system as recited in claim 8, wherein the core comprises a solid magnetic core.

10. The system as recited in claim 9, wherein the solid magnetic core comprises a material selected from the group consisting of: iron; and an iron-containing alloy.

11. The system as recited in claim 9, wherein the solid magnetic core comprises a "U" core.

12. The system as recited in claim 8, further comprising a heat sink positioned to receive heat directly from ferrofluid in the coolant loop.

13. The system as recited in claim 12, wherein a portion of the at least one coolant loop exclusive of the coolant channel passes through the heat sink.

14. A method for cooling a core-coil electromagnetic device, the method comprising:
- inducing magnetic flux and temperature field around a core of the core-coil device, thereby inducing flow of a coolant liquid comprising ferrofluid through the core and transferring heat generated by the core-coil electromagnetic device to the coolant fluid;
- circulating the coolant liquid, via a response of the ferrofluid to thermal and magnetic field gradients generated by the device, through a coolant loop, thereby removing heat from the coolant fluid;
- directing the coolant fluid back to the core of the core-coil electromagnetic device, thereby forming a continuous moving coolant loop,
- wherein the ferrofluid is impelled through the coolant loop by a magnetic field generated by the core-coil device, the magnetic field being immobile relative to the coolant loop.

15. The method as recited in claim 14, comprising:
positioning at least a portion of the coolant loop adjacent to a heat sink.

16. The method as recited in claim 15, comprising:
transferring heat from the coolant liquid to the heat sink during circulation.

17. The method as recited in claim 16, wherein the heat sink substantially surrounds an exterior portion of the coolant loop.

18. The method as recited in claim 14, wherein the core comprises a solid magnetic core.

19. The method as recited in claim 17 wherein the solid magnetic core comprises a material selected from the group consisting of: iron; and an iron-containing alloy.

20. The method as recited in claim 18, wherein the solid magnetic core comprises a "U" core.

* * * * *